United States Patent [19]

Nozoe

[11] Patent Number: 5,752,351
[45] Date of Patent: May 19, 1998

[54] AUTOMOTIVE WINDOW CONSTRUCTION

[75] Inventor: Naoto Nozoe, Hamamatsu, Japan

[73] Assignee: Suzuki Motor Corporation, Shizuoka-ken, Japan

[21] Appl. No.: 606,423

[22] Filed: Feb. 23, 1996

[30] Foreign Application Priority Data

Apr. 12, 1995 [JP] Japan ................. 7-086556

[51] Int. Cl.⁶ ........................................ E06B 7/00
[52] U.S. Cl. ................... 52/204.591; 52/204.597; 296/201; 296/93
[58] Field of Search ............ 52/204.597, 204.591, 52/298; 296/200, 201, 84.1, 93, 96.11

[56]  References Cited

U.S. PATENT DOCUMENTS 2,606,635  8/1952  Clingman .................. 296/93 X
5,489,135  2/1996  Lipinski .................... 296/207 X

FOREIGN PATENT DOCUMENTS

319262  6/1989  European Pat. Off. ........... 296/93

*Primary Examiner*—Creighton Smith
*Attorney, Agent, or Firm*—Bell Seltzer Intellectual Property Law Group Alston & Bird LLP

[57]  ABSTRACT

In an automotive window construction in which a window glass around which a molding is disposed is mounted at a window opening by means of an adhesive, a protrusion for positioning the window by locking the tip end of the molding disposed to the window glass is formed at least at a front peripheral edge of the window opening. Also, a protrusion formed at a peripheral edge of the window opening is formed at least at either of an upper peripheral edge or a lower peripheral edge of the window opening.

2 Claims, 7 Drawing Sheets

AUTOMOTIVE WINDOW CONSTRUCTION

FIELD OF THE INVENTION AND RELATED ART STATEMENT

The present invention relates to an automotive window construction in which a window installation position can be checked easily.

Figure 6:
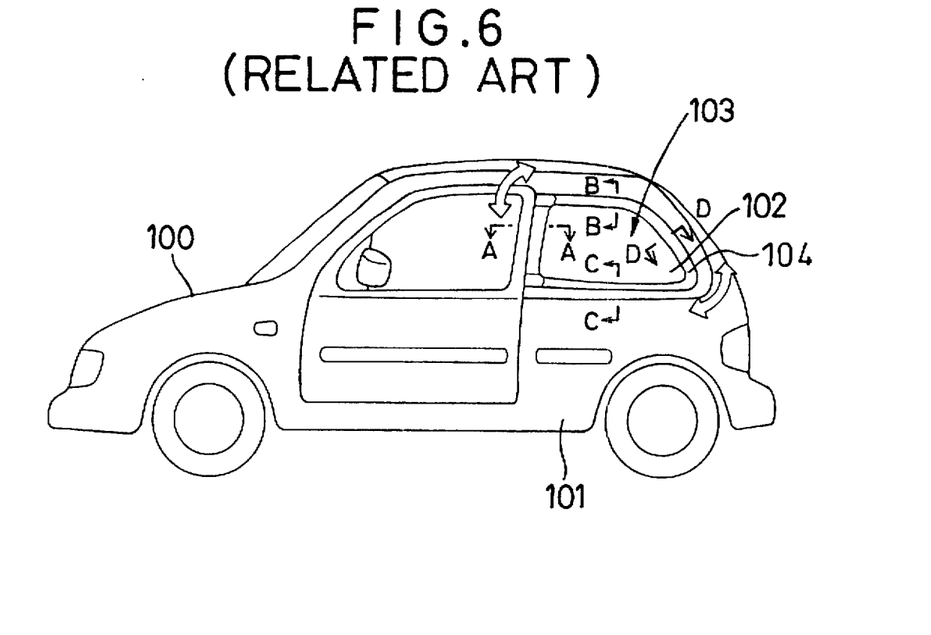
FIG. 6 is a side view showing a conventional automotive window construction.
Figure 7:
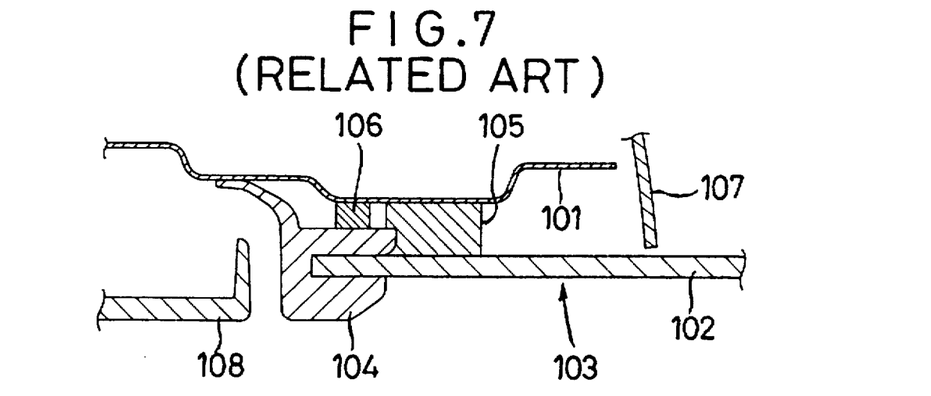
FIG. 7 is an enlarged sectional view taken along the line A—A of FIG. 6.
Figure 8:
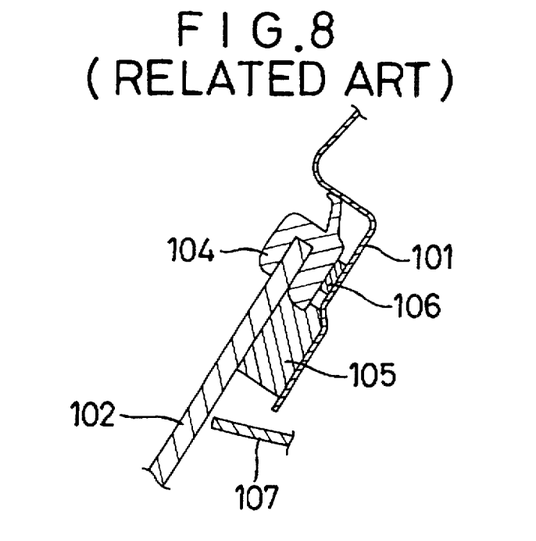
FIG. 8 is an enlarged sectional view taken along the line B—B of FIG. 6.
Figure 9:
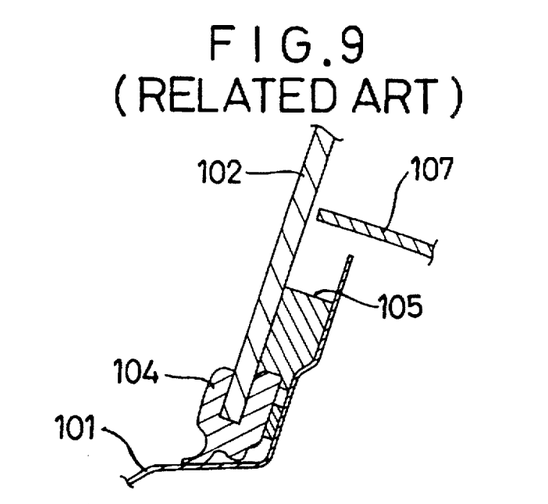
FIG. 9 is an enlarged sectional view taken along the line C—C of FIG. 6.
Figure 10:
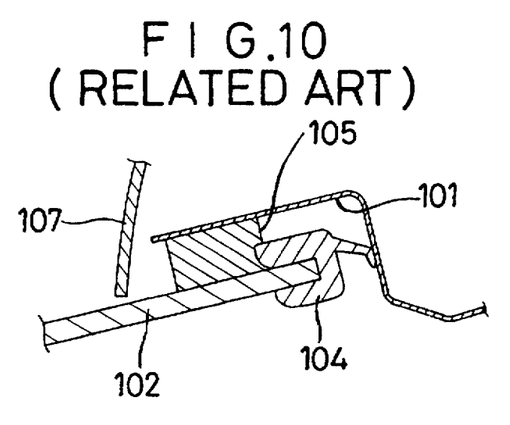
FIG. 10 is an enlarged sectional view taken along the line D—D of FIG. 6.

For an automotive side window, as shown in FIG. 6, a fixed type window 103 is sometimes used for a quarter window glass 102 or the like disposed on a side 101 of a vehicle body 100. One method for installing the window 103 of this type is to dispose a molding 104 around the quarter window glass 102, and to bond the window 103 to a window opening portion by means of an adhesive applied to the periphery of the quarter window glass 102.

For the window construction of this type, in installing the window 103, as shown in FIGS. 7 to 10, the molding 104 disposed around the quarter window glass 102 is put on the vehicle body side 101, the window 103 is positioned by eye measurement, and then the window 103 is fixed to a setting position on the vehicle body side 101 by means of the adhesive 105 applied to the quarter window glass 102.

Reference numeral 106 denotes a pressure sensitive adhesive double coated tape for bonding the molding 104 portion of the quarter window glass 102 to the vehicle body side 101, 107 denotes an interior trim disposed on the room side of the vehicle body 100, and 108 denotes a front door.

According the above-described prior art, however, when the window 3 is installed to the vehicle body side 101, as shown in FIG. 6, the window 103 is sometimes installed in such a manner as to be inclined to the right or the left with respect to the installation position as indicated by arrows in the figure or in such a manner as to get out of the position to the right or the left because the window 103 is positioned by eye measurement. This entails a disadvantage that the gap between the front door 108 and the window 103 becomes nonuniform.

OBJECT AND SUMMARY OF THE INVENTION

The present invention was made to solve the above problem. Accordingly, an object of the present invention is to provide an automotive window construction in which a window installation position can be checked easily.

To solve the above problem, according to the present invention, in an automotive window construction in which a window glass around which a molding is disposed is mounted at a window opening by means of an adhesive, a protrusion for positioning the window by locking the tip end of the molding disposed to the window glass is formed at least at a front peripheral edge of the window opening.

Also, in an automotive window construction in which a window glass around which a molding is disposed is mounted at a window opening by means of an adhesive, protrusions for positioning the window by locking the tip end of the molding disposed to the window glass are formed at least at two places, upper and lower places, at a front peripheral edge of the window opening.

Further, according to the present invention, a protrusion formed at a peripheral edge of the window opening is formed at least at either of an upper peripheral edge or a lower peripheral edge of the window opening.

The installation procedure according to the present invention is as follows: A protrusion for positioning the window by locking the tip end of the molding disposed to the window glass is formed at least at a front peripheral edge of the window opening.

Then, the window glass around which the molding is disposed is arranged at the window opening, positioned so that the tip end of the molding is locked against the protrusions, and mounted to the window opening by means of the adhesive applied to the periphery of the window glass.

The automotive window construction in accordance with the present invention achieves the effects described below.

According to the present invention, in an automotive window construction in which a window glass around which a molding is disposed is mounted at a window opening by means of an adhesive, a protrusion for positioning the window by locking the tip end of the molding disposed to the window glass is formed at least at a front peripheral edge of the window opening. Therefore, the positioning of the window installed to the window opening of the vehicle can be performed accurately. Also, the shift of the window in the turning direction can be prevented. Thereupon, the gap between the front door and the window can be made uniform.

In an automotive window construction in which a window glass around which a molding is disposed is mounted at a window opening by means of an adhesive, protrusions for positioning the window by locking the tip end of the molding disposed to the window glass are formed at least at two places, upper and lower places, at a front peripheral edge of the window opening. Therefore, the positioning of the window installed to the window opening of the vehicle can be performed accurately. Also, the shift of the window in the turning direction can be prevented. Thereupon, the gap between the front door and the window can be made uniform.

According to a preferred embodiment, a protrusion formed at a peripheral edge of the window opening is formed at least at either of an upper peripheral edge or a lower peripheral edge of the window opening. Therefore, the positioning of the window installed to the window opening of the vehicle can be performed accurately in the longitudinal and vertical directions. Also, the shift of the window in the turning direction can be prevented. Thereupon, the gap between the front door and the window can be made uniform.

DETAILED DESCRIPTION OF PREFERRED EMBODIMENTS

One embodiment of the present invention will be described in detail below with reference to the drawings.

Figure 1:
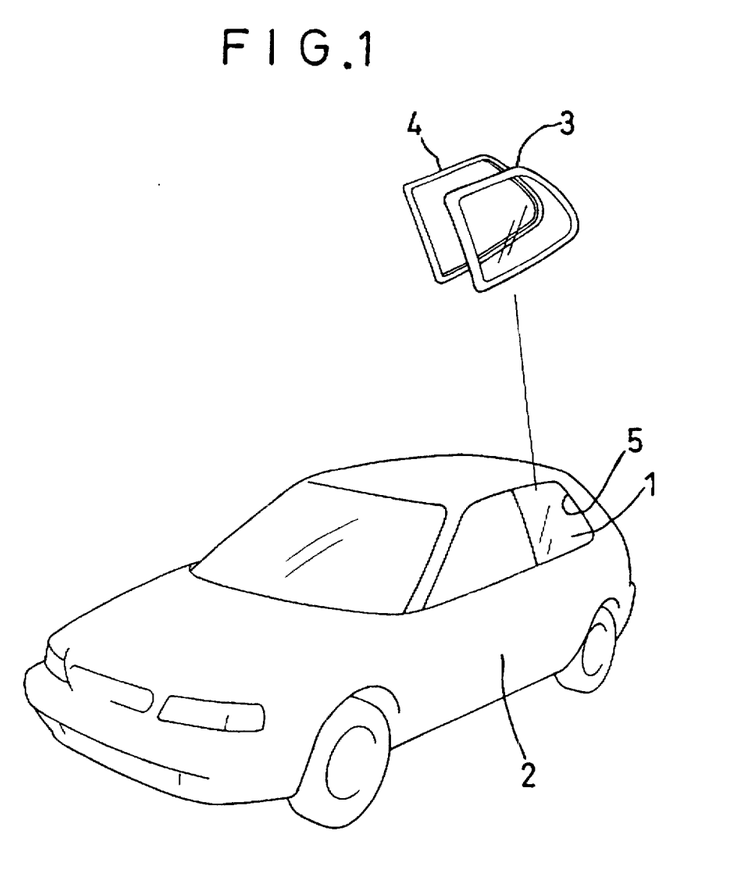
FIG. 1 is a perspective view showing an automotive window construction in accordance with one embodiment of the present invention.
Figure 2:
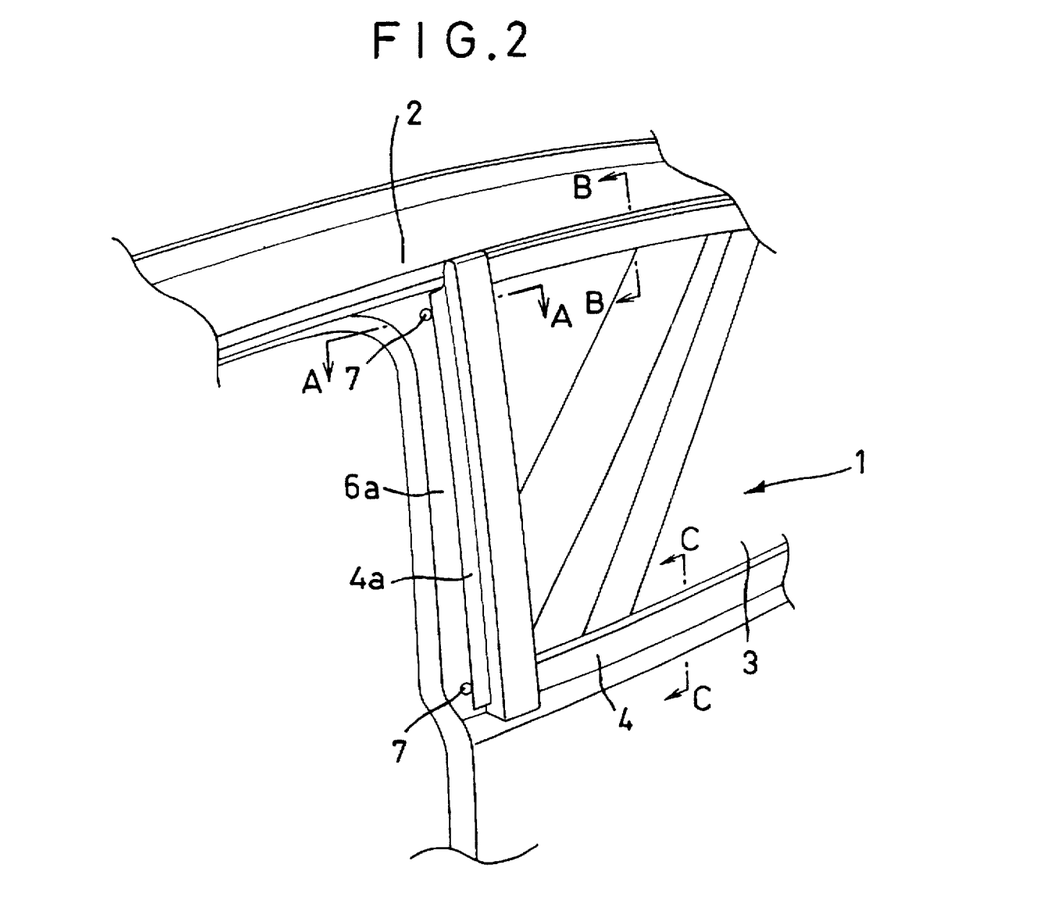
FIG. 2 is an enlarged perspective view showing an automotive window construction in accordance with one embodiment of the present invention.
Figure 3:
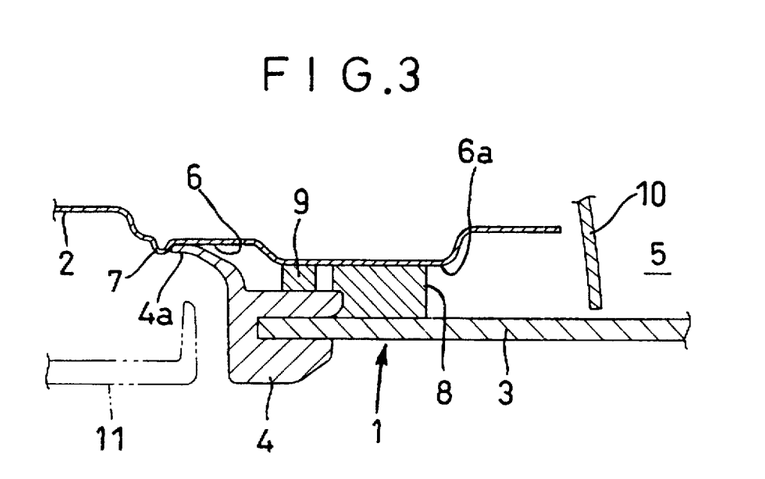
FIG. 3 is a sectional view taken along the line A—A of FIG. 2.

In FIGS. 1 to 3, reference numeral 1 denotes a window installed on a side of a vehicle body of an automobile. This window 1 comprises a quarter window glass 3 and a molding 4 disposed around the quarter window glass 3. At the periphery of the molding 4, a lip 4a is integrally formed at the tip end thereof.

On the other hand, protrusions 7 for locking the lip 4a of the molding 4 are installed at two places at the upper and lower parts of at least a front peripheral edge 6a of a peripheral edge 6 at which a window opening 5 of the vehicle 2 is formed.

The window 1 is positioned by locking the lip 4a at the tip end of the molding 4 against the protrusions 7. This window 1 is bonded by means of an adhesive 8 applied around the quarter window glass 3 and a pressure sensitive adhesive double coated tape stuck to the inside of the molding 4. Reference numerals 10 and 11 are an interior trim disposed on the room side of the vehicle 2 and a front door, respectively.

According to the above construction, when the window 1 is assembled to the vehicle 2, the adhesive 8 is applied to the periphery of the quarter window glass 3 and the pressure sensitive adhesive double coated tape 9 is stuck to the inside of the molding 4 in advance.

Then, the window 1 is positioned by putting the lip 4a of the molding 4 on two protrusions 7 at the upper and lower parts of the front peripheral edge 6a. Thereupon, the window 1 is arranged at a predetermined position.

Thereafter, the quarter window glass 3 is pushed against the vehicle 2 and the window 1 is bonded and fixed at the predetermined position by means of the adhesive 8 and the pressure sensitive adhesive double coated tape 9.

Thus, since the window 1 is positioned by two protrusions 7 at the upper and lower parts of the front peripheral edge 6a of the vehicle 2, the window 1 neither get out of position to the right or the left nor is inclined by turning.

Figure 4:
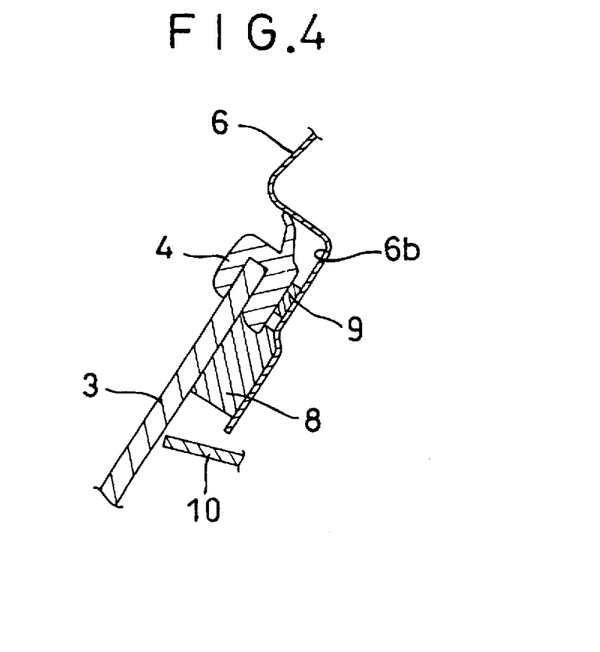
FIG. 4 is a sectional view taken along the line B—B of FIG. 2.
Figure 5:
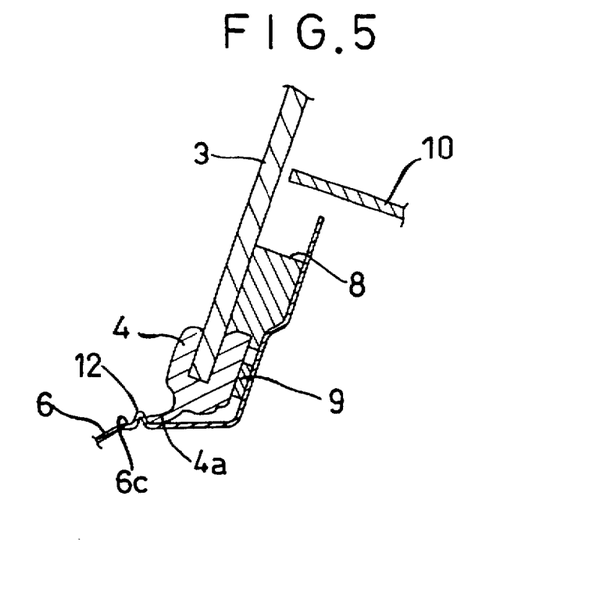
FIG. 5 is a sectional view taken along the line C—C of FIG. 2.

In the above embodiment, the protrusions 7 are formed at two places at the upper and lower parts of the front peripheral edge 6a of the peripheral edge 6 at which the window opening 5 of the vehicle 2 is formed. Alternatively, as shown in FIGS. 4 and 5, a protrusion 12 may be formed at either of an upper peripheral edge 6b or a lower peripheral edge 6c in addition to the protrusions 7.

In this case, the vertical positioning of the window 1 can also be performed because the upper or lower lip 4a of the molding 4 is locked against the protrusion 12. At this time, even if one protrusion 7 is formed at the front peripheral edge 6a, the window does not turn. FIGS. 4 and 5 show a case where a protrusion 12 is formed at the lower peripheral edge 6c.

The above-described automotive window construction achieves the effects described below.

In the automotive window construction in which the quarter window glass 3 around which the molding 4 is disposed is mounted at the window opening 5 by means of the adhesive, the protrusions 7 for positioning the window 1 by locking the tip end of the molding 4 mounted to the quarter window glass 3 are formed at least at the front peripheral edge 6a of the window opening 5. Therefore, the positioning of the window 1 installed to the window opening 5 of the vehicle 2 can be performed accurately. Also, the shift of the window 1 in the turning direction can be prevented. Thereupon, the gap between the front door 11 and the window 1 can be made uniform.

Also, the protrusions 7 for positioning the window 1 by locking the tip end of the molding 4 mounted to the quarter window glass 3 are formed at least at two places, upper and lower places, at the front peripheral edge 6a of the window opening 5, so that the positioning of the window 1 installed to the window opening 5 of the vehicle 2 can be performed accurately, and the shift of the window 1 in the turning direction can be prevented. Thereupon, the gap between the front door 11 and the window 1 can be made uniform.

Further, the protrusion 12 formed at the peripheral edge 6 of the window opening 5 is formed at least at either of the upper peripheral edge 6b or the lower peripheral edge 6c, whereby the positioning of the window 1 installed to the window opening 5 of the vehicle 2 can be performed accurately in the vertical direction as well. Also, the shift of the window 1 in the turning direction can be prevented, whereby the gap between the front door 11 and the window 1 can be made uniform.

I claim:

1. An automotive window construction comprising an automotive body having a window opening in a lateral side of a rear part thereof, said opening being defined by a peripheral edge of the automotive body, a quarter window glass positioned in said window opening and being attached to said opening by an adhesive, and a molding disposed around said quarter window glass and being secured to said peripheral edge by a double sided adhesive and having a tip end, said peripheral edge of said automobile body including formed in at least upper and lower locations at a front peripheral edge of said window opening and on a substantially flat surface of said window opening in a location substantially unobstructed by said tip end of said molding, said protrusions determining a position of the quarter window glass in said window opening of said automobile body by engagement with the tip end of said molding.

2. An automotive window construction according to claim 1 additionally comprising at least one protrusion formed in an upper peripheral edge or a lower peripheral edge of said window opening, and on a flat, exterior surface thereof.

* * * * *

UNITED STATES PATENT AND TRADEMARK OFFICE
CERTIFICATE OF CORRECTION

PATENT NO. : 5,752,351
DATED : May 19, 1998
INVENTOR(S) : Nozoe

It is certified that error appears in the above-identified patent and that said Letters Patent is hereby corrected as shown below:

Column 4, line 43, after "end" delete ",".

Column 4, line 43, after "including" insert --protrusions--.

Signed and Sealed this

Fifteenth Day of December, 1998

Attest:

BRUCE LEHMAN

Attesting Officer

Commissioner of Patents and Trademarks